United States Patent [19]
Brownlie et al.

[11] Patent Number: 5,122,069
[45] Date of Patent: Jun. 16, 1992

[54] ACCESS FLOORING MODULE

[75] Inventors: Alan W. Brownlie, Skaneateles, N.Y.; Jack W. Lawhead, Harrisburg, Pa.; Clifford F. Lincoln, Atlanta, Ga.; Ned A. Sigmon, Clemmons, N.C.

[73] Assignee: AMP Incorporated, Harrisburg, Pa.

[21] Appl. No.: 717,866

[22] Filed: Jun. 19, 1991

Related U.S. Application Data

[63] Continuation of Ser. No. 535,095, Jun. 8, 1990, abandoned, which is a continuation-in-part of Ser. No. 387,560, Jul. 28, 1989, Pat. No. 4,984,982.

[51] Int. Cl.⁵ .................... H01R 13/73; H01R 13/60
[52] U.S. Cl. ....................... 439/131; 174/53; 439/535
[58] Field of Search ............... 439/131, 535, 538, 539; 174/53, 48, 59, 68.5; 220/3.2–3.7, 3.94

[56]  References Cited

U.S. PATENT DOCUMENTS

| | | | |
|---|---|---|---|
| 2,268,090 | 12/1941 | Windsor | 174/53 |
| 2,625,288 | 1/1953 | Clark et al. | 220/3.94 |
| 2,686,065 | 8/1954 | Bergquist | 220/3.2 |
| 2,811,574 | 10/1957 | Guerrero | 174/57 |
| 3,131,512 | 5/1964 | Macleod Jr. | 50/127 |
| 3,433,886 | 3/1969 | Myers | 174/57 |
| 3,587,906 | 6/1971 | Pepe | 174/53 |
| 3,622,684 | 11/1971 | Press | 174/48 |
| 3,646,244 | 2/1972 | Cole | 174/57 |
| 3,794,956 | 2/1974 | Dobreuil | 339/34 |
| 3,972,579 | 8/1976 | Kohaut | 339/34 |
| 3,992,070 | 11/1976 | Dunn et al. | 312/320 |
| 4,295,018 | 10/1981 | Borrelli | 174/53 |
| 4,372,629 | 2/1983 | Propst | 312/223 |
| 4,511,198 | 4/1985 | Mitchell | 339/34 |
| 4,551,577 | 11/1985 | Byrne | 174/57 |
| 4,747,788 | 5/1988 | Byrne | 489/131 |

FOREIGN PATENT DOCUMENTS

| | | | |
|---|---|---|---|
| 658303 | 3/1938 | Fed. Rep. of Germany | 439/131 |
| 1402267 | 8/1975 | United Kingdom | 439/131 |

OTHER PUBLICATIONS

Toli Flex Tile Catalogue (Japan).
USG Interiors, Inc. Donn Servicenter Outlets Catalogue, 1988.
Walker Flex Series Catalogue AFS 487.
Midland Ross Mult-A-Cell Access Floor Delivery Module Catalogue.
Lithonia Reloc Floor Module Catalogue 6/88, Form No. 670.95.
Raceway Components, Inc. "Floor Mate" Access Floor Electrification Unit Catalogue.

Primary Examiner—Neil Abrams
Attorney, Agent, or Firm—Robert W. Pitts; Anton P. Ness

[57]  ABSTRACT

An access floor module for use with wiring extending beneath the floor of a structure can be used with both high tension and low tension conductors. High tension and low tension outlets can be mounted on the front of a rotatable frame member. Cables are attached to the back and the frame can be inserted into the floor into the plenum beneath the access floor on the same level as the cables and the frame pivotably mounted with respect to the floor. The frame also provides structural support for the module cover.

19 Claims, 10 Drawing Sheets

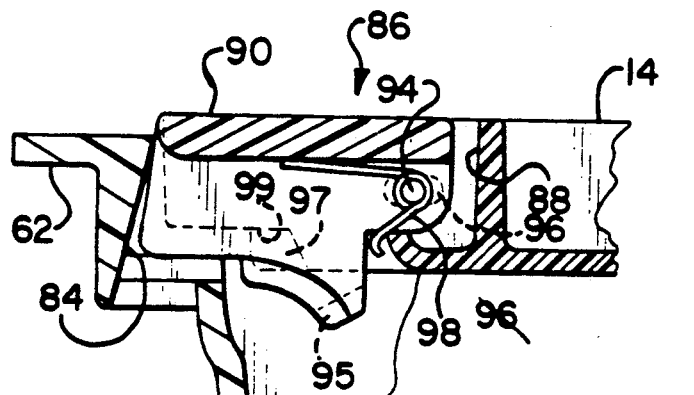
FIG. 5
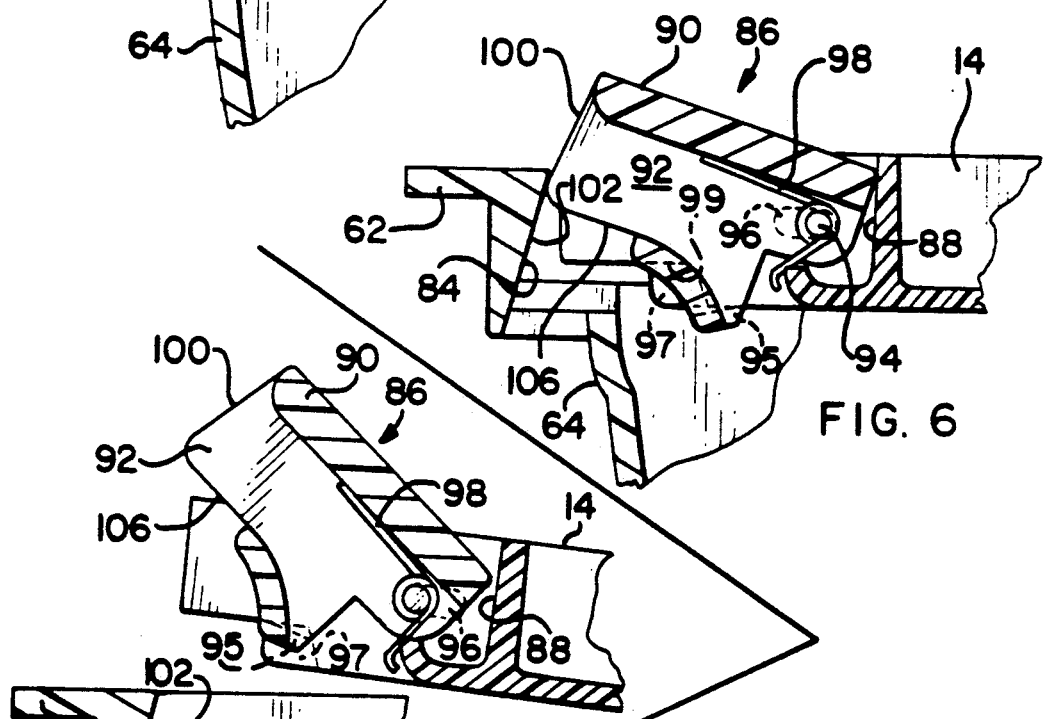
FIG. 6
FIG. 7
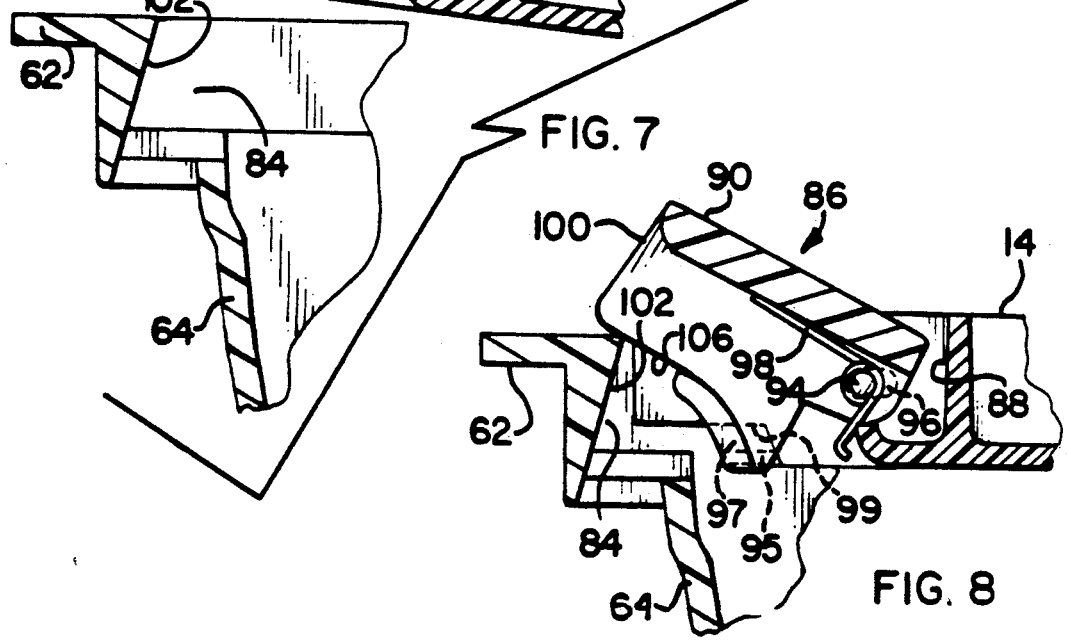
FIG. 8

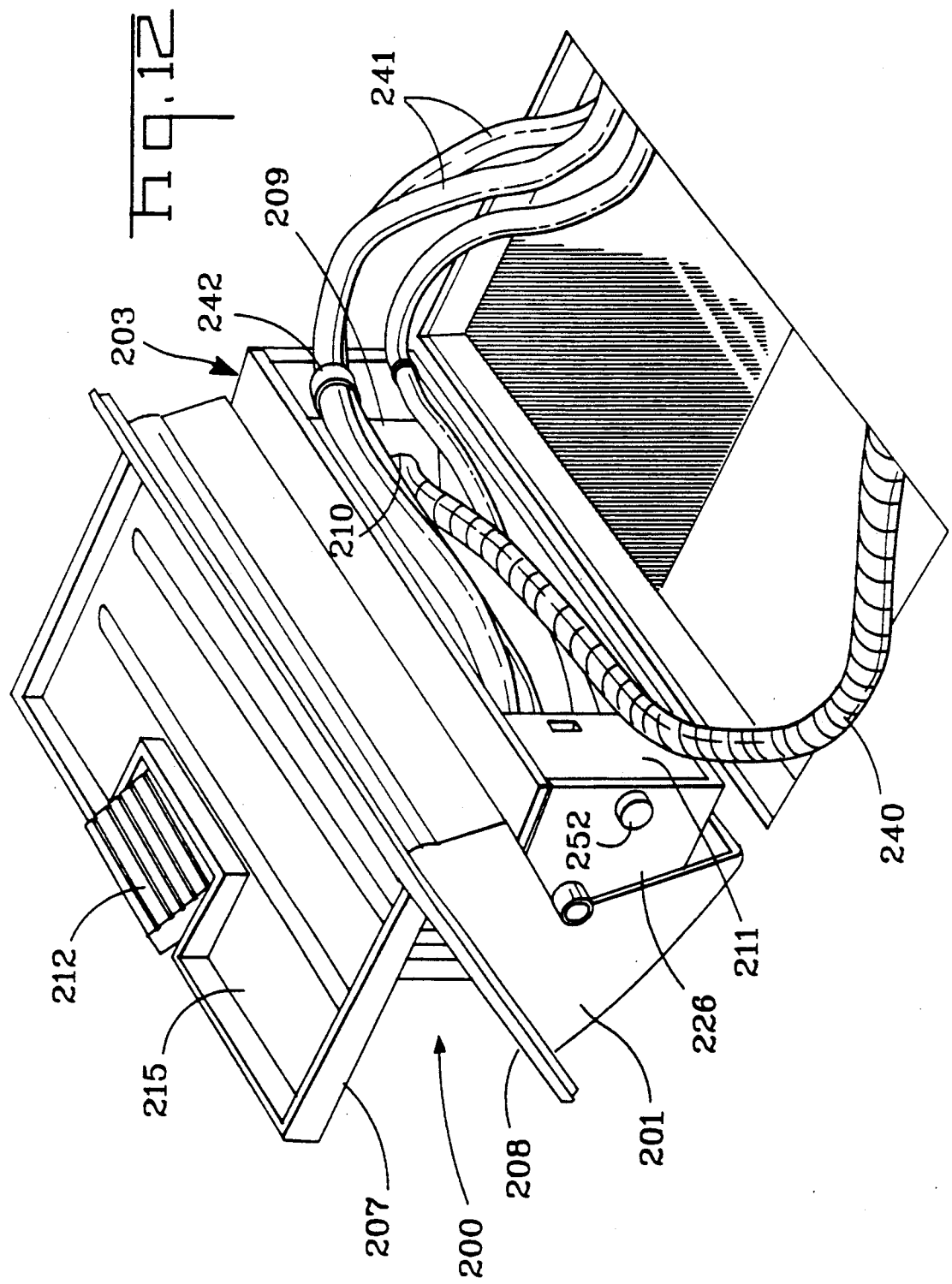

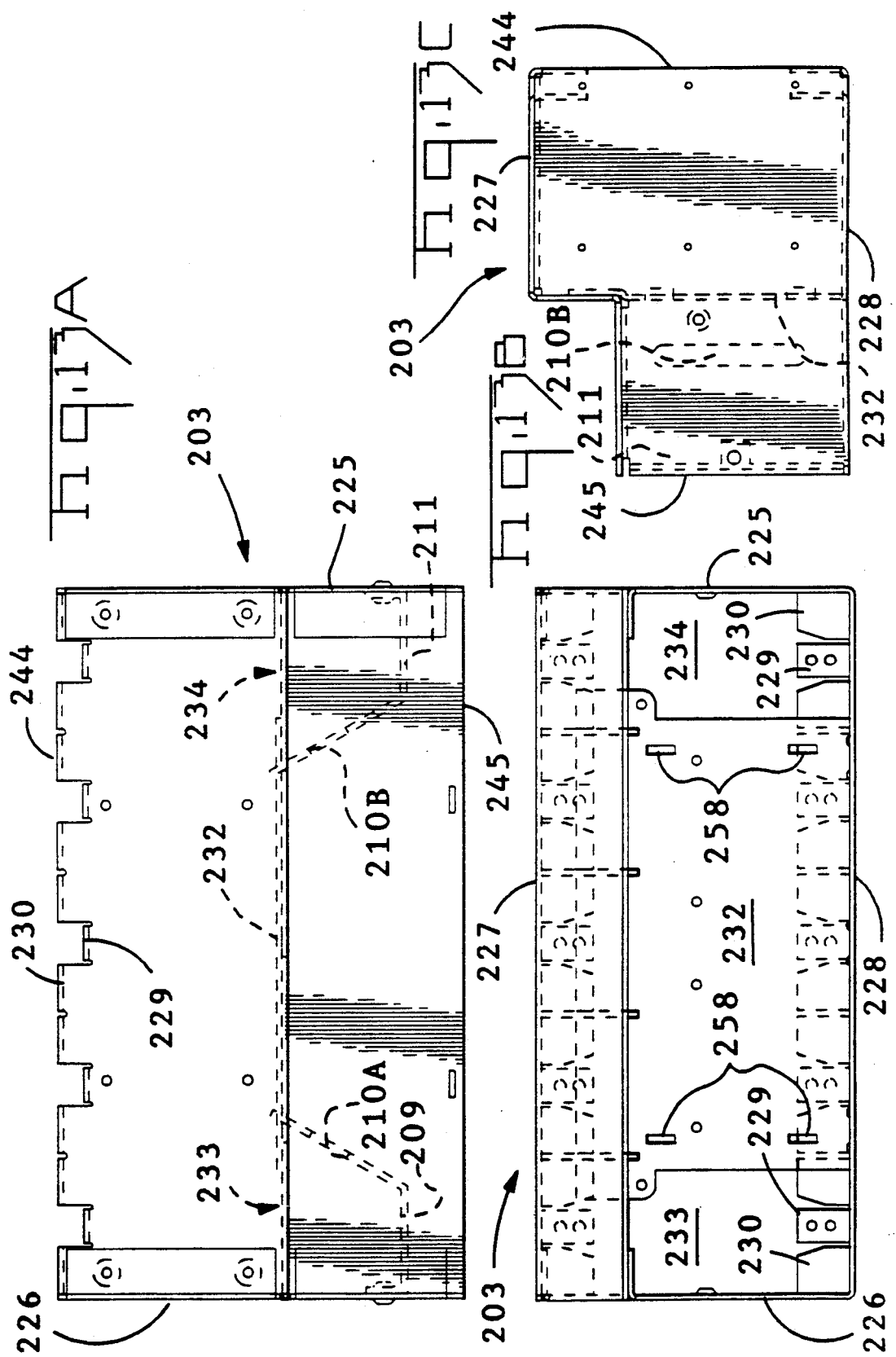

ACCESS FLOORING MODULE

CROSS REFERENCE TO PENDING APPLICATION

This application is a continuation of application Ser. No. 07/535,095 filed June 8, 1990, now abandoned, in turn, a continuation-in-part of application Ser. No. 07/387,560 filed July 28, 1989, now U.S. Pat. No. 4,984,982.

FIELD OF THE INVENTION

The invention is directed to an access flooring module in which electrical power and signal cables are made available to the user. In particular, the access flooring module is configured to be easily adaptable and easy to operate.

BACKGROUND OF THE INVENTION

As the use of modular offices increases, it is essential that power and signal cables be delivered to these offices in a manner which will not interfere with the daily operations of the personal which occupy the offices. Consequently, the use of access flooring is becoming widespread.

Access flooring allows the power and signal cables to be placed beneath the floor in a position which will not interfere with the placement of walls or furniture. The use of access flooring also allows the power and signal cables to be moved as the modular offices are moved.

In order for the power and signal cables to be utilized, the cables are currently terminated in access flooring modules. These access flooring modules provided the end user or operator with the means to connect his office equipment to the power and signal cables required for the proper operation thereof.

There are many access flooring modules currently available in the market. However, the access flooring modules available have problems associated therewith, which make them difficult to use and service.

A typical access flooring module has a cover which is pivoted to an open position to reveal the various power and signal components which are terminated therein. The power and signal components remain in a constant position. This type of configuration is difficult for a typical office worker to use, as the plugs are positioned below the level of the floor. The configuration is also difficult for an installer/repairman. As the plugs need to be repaired or replaced, the positioning of the plugs in the floor is not a preferred position. Consequently, the office worker must assume an awkward position if a plug is to be inserted or removed from the access flooring module. A further difficulty associated with this type of flooring module resides in the fact that the office worker will be unable to properly view the termination of the plug to the socket. This is of particular concern if the access flooring module has many termination provided therein. Consequently, the plug may be improperly inserted into the socket, resulting in an ineffective electrical connection between the plug and the socket.

One solution to this type of problem is shown in U.S. Pat. No. 3,972,579. The electrical insert device shown in the patent has pivot means which cause the electrical receptacle to be positioned in the same plane as the floor when the cover is moved to the open position. This allows the operator to more easily access the electrical receptacle, thereby reducing the possibility of mis-insertion of the plug into the receptacle.

While the above-referenced patent discloses an electrical insert device which is more user friendly than other modules, several problems are associated with the device. The device is difficult to access when it is in the closed position, as no easily accessible latch means are provided thereon. Consequently, there is no easy means to pivot the cover from the closed position to the open position. A second problem associated with the device, is that no means is provided to control the motion of the device when the device is moved between the open position and the closed position. In other words, if the user or operator does not maintain control of the cover as the device is closing, the uncontrolled movement of the device may cause damage to the wire or electrical components provided in the device, resulting in an ineffective electrical connection. This is particularly true if signal cables are provided in the device.

A third problem associated with the device disclosed in the patent relates to its inflexibility in adapting to various configurations. It is important in office settings that the access flooring modules be able to provide the power and signal terminations required. This includes the ability for the modules to accommodate the changing needs of the office, i.e. the inclusion or removal of either signal or power terminations as required. However, the device disclosed in the above-referenced patent is not configured to provide for the inclusion or removal of power or signal terminations. It is also worth noting that the problems discussed in relation to the patent are not exclusive to that device, but are present in the majority of access flooring modules currently available.

SUMMARY OF THE INVENTION

The object of the invention is to provide an electrical connector assembly for use in an access floor or the like. The assembly is modular in nature and more user friendly than the assembly known in the art.

An aspect of the invention is directed to an electrical assembly having electrical sockets provided therein. The electrical assembly has an inner assembly which has a first sidewall, a second sidewall, and endwalls. An outer frame means, which has a front wall, is spaced from the first side wall of the inner assembly. Pivot means are provided between the inner assembly and the outer frame means, the pivot means allow the inner assembly to move between a first position and a second position relative to the outer frame means. A deformable member is provided proximate to and integrally attached to the first sidewall of the inner assembly, whereby as the inner assembly is moved between the first and the second positions, the deformable member will engage the front wall of the outer assembly, causing the deformable member to frictionally engage the front wall in such a manner so as to insure that the motion of the inner assembly between the first and the second position will be done in a controlled manner which will not damage the electrical sockets provided in the assembly.

An alternative aspect of the invention is directed to an electrical assembly having electrical sockets provided therein, as described above. A plurality of slots are provided in the housing means, the slots extend from the top surface to the bottom surface. At least one dividing wall is positioned in respective slots, the respective slots cooperate with the walls to insure that each dividing wall is maintained in position relative to the housing means. Each dividing wall can be positioned in any respective slot, whereby as the electrical assembly is required to house power and signal sockets, the dividing wall can be positioned between the power and signal sockets, in the respective slot, to insure that the reliability of each socket will be insured, and as the the requirements of the electrical assembly change, the dividing wall can be moved as required.

The electrical assembly of the present invention further provides that power and communication outlets and cables therefor can be positioned on either end of the assembly, and the number of outlets can be varied as desired. The frame provides brackets mountable at respective ends of the frame along the bottom to provide cable exit apertures for either power or communication cables, in a manner which results in the cables exiting the frame to be routed initially generally along the rear face of the frame from one end toward the other or approximately at a right angle to the rear face, and oriented generally along the pivot of the assembly and also generally parallel to the floor within the plenum.

BRIEF DESCRIPTION OF THE DRAWINGS

FIG. 5 is a fragmentary view of the latch associated with the module, the latch is shown in the first or closed position.

FIG. 6 is a fragmentary view similar to that of FIG. 5, the latch is position in a partially open or intermediate position.

FIG. 7 is a fragmentary view similar to that of FIG. 6, the latch and cover plate are provided in an second or open position.

FIG. 8 is a fragmentary view similar to that of FIG. 7, the latch is provided in the open position and the cover plate is provided in the closed position.

FIG. 12 is a rear view of the module showing the manner in which cables can be attached to the module.

FIGS. 13A-13C are top, rear and side views of the module.

DETAILED DESCRIPTION OF THE INVENTION

Figure 1:
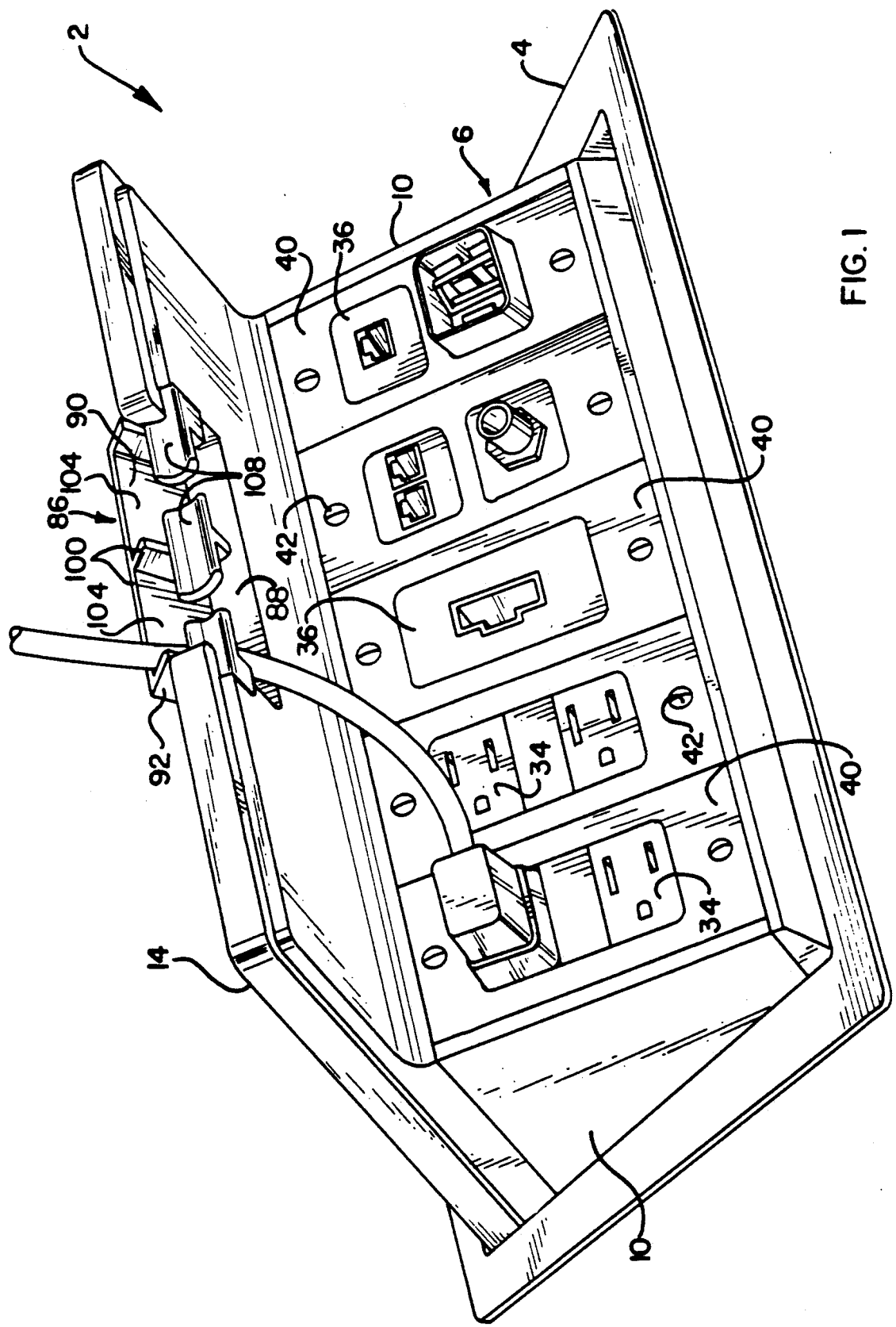
FIG. 1 is a perspective view of a access flooring module according to the present invention, the module is shown position in the open position.
Figure 2:
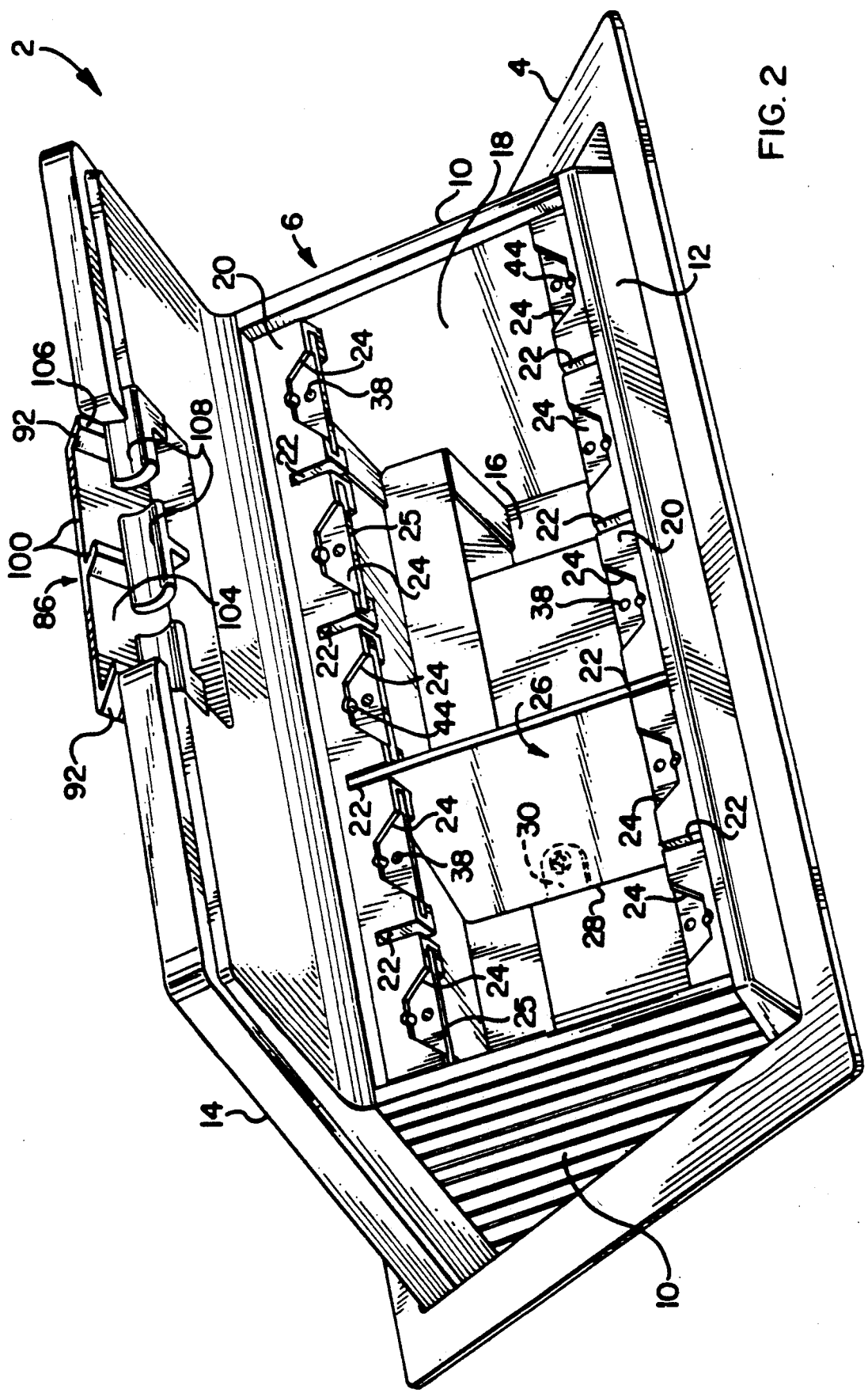
FIG. 2 is a perspective view of the module similar to that shown in FIG. 1, the module has the face plate and the electrical components removed to better show the inside structure of the module.
Figure 3:
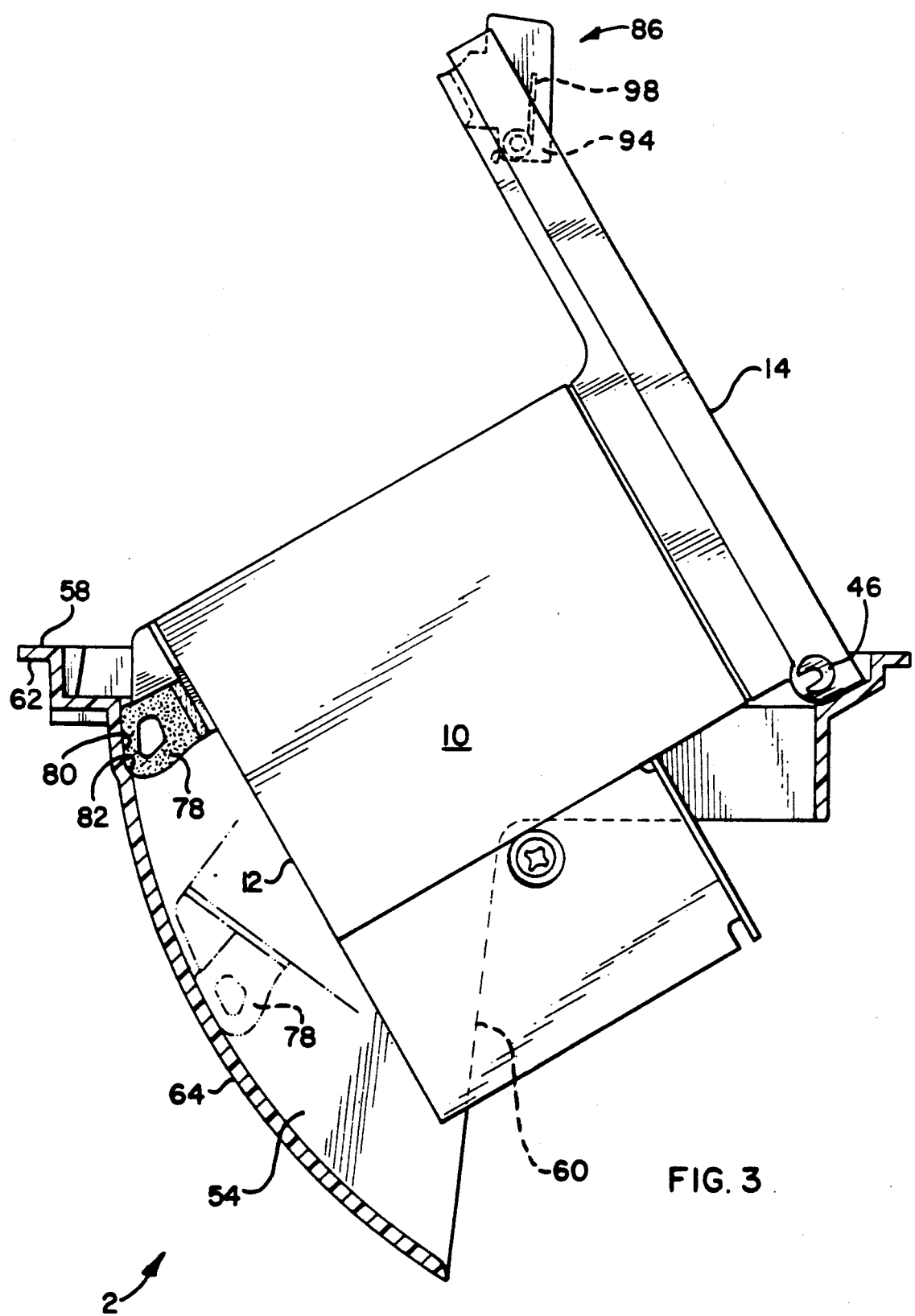
FIG. 3 is a cross-sectional view of the module provided in the access floor, the module is shown in the open position.
Figure 4:
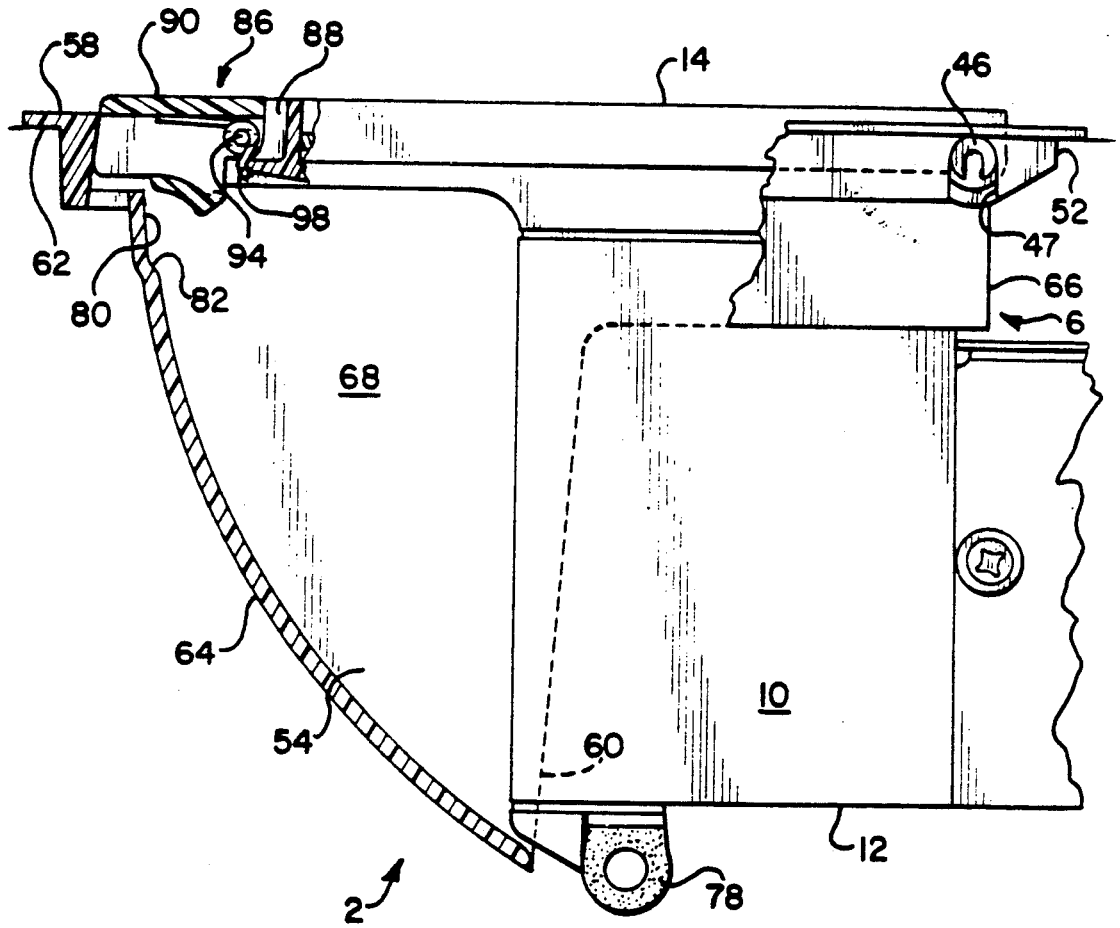
FIG. 4 is a cross-sectional view of the module provided in the access floor, the module is shown in the closed position.

As is best shown in FIGS. 1 through 4, access flooring module 2 is configured to be disposed in an opening 4 which is provided in an access floor or the like. The module 2 is movable relative to the floor between an open position, as shown in FIG. 3, and a closed position, as shown in FIG. 4.

Referring to FIG. 4, module 2 has an inner assembly 6 which has end walls 10, a sidewall 12, a cover plate 14, and a bottom wall 16 which cooperate to form a boxlike structure which has an opening 18 (FIG. 2) into which the electrical components of the access flooring module are received.

Each sidewall 12, as shown in FIG. 2, has a face plate supporting projection 20 which extends therefrom. The face plate supporting projections 20 are positioned adjacent to the ends of the sidewalls 12 which are opposite the bottom wall 16. The projections 20 extend from the sidewalls 12 into opening 18 in a direction which is essentially parallel to the plane of the bottom wall 16. Each assembly 6 has two identical projections 20 which extend into opening 18 in opposed relationship to each other. As is best shown in FIG. 2, projections 20 have slots 22 and face plate receiving recesses 24 provided therein. Each respective slot 22 and recess 24 of the first projection 20 is provided in alignment with a corresponding slot 22 and recess 24 of the second projection 20. A plurality of metal plates 25 are provided in projections 20. As best shown in FIG. 2, the plates are separated from each other and encased by dielectric material.

Dividing wall 26 is provided in respective slots 22 of projections 20. The side edges of the wall 26 are positioned in the slots 22, thereby preventing wall 26 from movement relative to the endwalls 10 of the assembly. A leading edge 28 of dividing wall 26 has at least one securing projection 30 which extends therefrom. When the dividing wall is properly inserted into the assembly, the projection 30 is positioned adjacent to the bottom wall 16 and secured thereto. This insures that the dividing wall 26 will be maintained in the position required for operation. It should be noted that the plurality of slots 22 provided in the projections 20 allow the wall 26 to be positioned in various positions in the opening 18, as will be more fully discussed.

Recesses 24 are dimensioned to receive portions of the electrical components therein. The electrical components, i.e. power sockets 34 or signal sockets 36 (FIG. 1), are inserted into opening 18 such that mounting projections (not shown) of the electrical components are received in the recesses 24 of projections 20 and placed in electrical engagement with plates 25. The electrical components are then secured to the projections 20 by the use of screws or the like inserted into openings 38. The cooperation of the components with respective isolated plates 25 provides the insulation grounding required for the effective operation of the components. After the components have been secured to the plates 25 of projections 20, modular face plates 40, as shown in FIG. 1, are inserted over the electrical components. The face plates 40 are secured to the projections 20 by means of screws 42 which cooperate with openings 44 (FIG. 2).

In the embodiment shown in FIG. 1, the access flooring module 2 has five electrical components provided therein, two of the components are power sockets 34 and three are signal sockets 36. However, as the requirements of the module will vary, the embodiment shown in the drawings is meant to be viewed as an illustration of a typical embodiment.

With the use of access flooring modules, it is important that the power and signal transmissions be delivered to the same location. This arrangement minimizes the space required and simplifies the termination which the user must perform. However, as the current supplied by the power components 34 is significant, the reliability of the signal components 36 can be affected due to the close proximity to the power components. It is therefore important that the power and signal components be separated in order to insure for their effective operation. Consequently, the dividing wall 26 separates the power and signal components 34, 36.

In order for module 2 to be useable in a variety of situations, wall 26 must be movable between various slots. This allows any particular position in the modular assembly to be used for power or signal components as required. Therefore, the dividing wall 26 can be moved between any pair of electrical components 34, 36, in order to provide the shielding required. This modular aspect of the assembly is extremely beneficial. As the needs of an office are continually changing, it is vital for the modular assembly to meet the changing needs of the office. Therefore, as wall 26 is movable, the assembly 2 of the present invention can be modified as required. In other words, if an office requires more signal sockets and less power sockets, the wall 26 can be moved and the appropriate components installed. This eliminates the need to replace the entire assembly, resulting in a great cost savings.

In order to facilitate the movement of the assembly between the open and the closed positions (FIGS. 3 and 4), a pivot member 46 is provided. This pivot member cooperates with the cover plate 14 to insure that the box-like structure will pivot as desired. In order to facilitate this pivoting action, an arcuate surface 48 is provided on the cover plate 14, proximate pivot member 46. As the cover plate is moved between the open and the closed position, the arcuate surface 48 of the cover plate 14 is caused to cooperate with a shoulder 50 of rim 52, as best shown in FIGS. 3 and 4. The cooperation, or the sliding engagement, of surface 48 and shoulder 50 prevents the pivot member 46 from being damaged as a force is applied to the cover plate 14. In other words, if a force, which is directed downward in a direction which is essentially perpendicular to the axis of the pivot member 46, is applied to the cover plate 14 during the operation of the cover plate, the force will be transferred from the cover plate to the rim 52, due to the physical engagement of the surface 48 with the shoulder 50. As the rim and shoulder are made from relatively strong material, this force will not damage the assembly. If the surface and the shoulder were not provided the force applied to the cover plate 14 would be distributed to the relatively weak pivot member 46, which could result in the failure of the assembly.

In order to insure that the forces applied to the cover plate are transferred to the rim and shoulder, the pivot member is retained in slot 47. As shown in FIG. 4, slot 47 is configured to allow the pivot member 46 to move or "float" in the slot, in a direction which is essentially parallel to the longitudinal axis of the slot. Consequently, as the pivot member is not contained in the vertical direction (as viewed in FIG. 4), the application of a force to the cover plate 14 will cause the surface 48 of plate 14 to move against the shoulder 50 of rim 52. This provides the means required to transfer the force from the cover plate to the rim, without damaging the pivot member.

As shown in FIGS. 1 through 4, assembly 6 is positioned in a metal casing 54 which is positioned in the opening 4 of the floor. The metal casing 54 has an opening 56 for receipt of the assembly 6 therein. The opening 56 extends from a top surface 58 to a bottom surface 60 thereof. Provided proximate the top surface 58 is shoulder 62 which extends about the perimeter of the top surface 58. The shoulder 62 extends from sidewalls 64, 66 of the casing 54 in a direction which is essentially parallel to the top surface 58. The shoulder 62 cooperates with the floor to maintain the casing 54 and assembly 6 in position relative to the floor. A shroud is provided over the shoulder to provide an aesthetically pleasing appearance.

Sidewall 64 has an arcuate configuration, as will be more fully discussed. End walls 68 of casing have the slots 47 provided proximate top surface 58 thereof. As was previously discussed, the openings cooperate with pivot members 46 so that pivot members 46 allow assembly 6 to move relative to casing 54.

As best shown in FIGS. 3 and 4, sidewall 12 of assembly 6 has deformable member 78 attached thereto. The member 78 is made from rubber or some other material which is able to be deformed when a force is applied thereto and which will return to its original shape when the forces are retracted. As is shown in FIG. 4, when the assembly 6 is provided in the closed position, the deformable member 78 is not engaged. As the assembly 6 is moved to the open position, the member 78 engages the inside surface of arcuate sidewall 64 of casing 54, as is shown in phantom in FIG. 3. The engagement of member 78 with sidewall 64 provides a frictional force therebetween. This force is not of sufficient magnitude to prevent the movement of the assembly 6 between the open and the closed position. However, the engagement is sufficient to prevent the assembly 6 from being moved in such a manner so as to damage the electrical components 34, 36 provided in the assembly. As a force is applied to the assembly 6, to either open or close the assembly 6 relative to the casing 54, the member 78 will engage the sidewall 64 and provide a force which resists the movement of the assembly 2. The resistance force is not sufficient to prevent the movement; it is merely sufficient to insure that the movement of the assembly 6 will be done in a controlled manner.

When the assembly 6 is placed in the open position, as shown in FIG. 3, the member 78 is moved into a recess 80 provided on the inside surface of the sidewall 64. The positioning of the member 78 in the recess 80 provides a positive means to retain the assembly 6 in the open position. In this open position, the member 78 is provided in engagement with a shoulder 82 of the recess 80. The engagement between the shoulder 82 and member 78 prevents the assembly 6 from prematurely returning to the closed position. Consequently, the assembly 6 is maintained in the open position.

Figure 9:
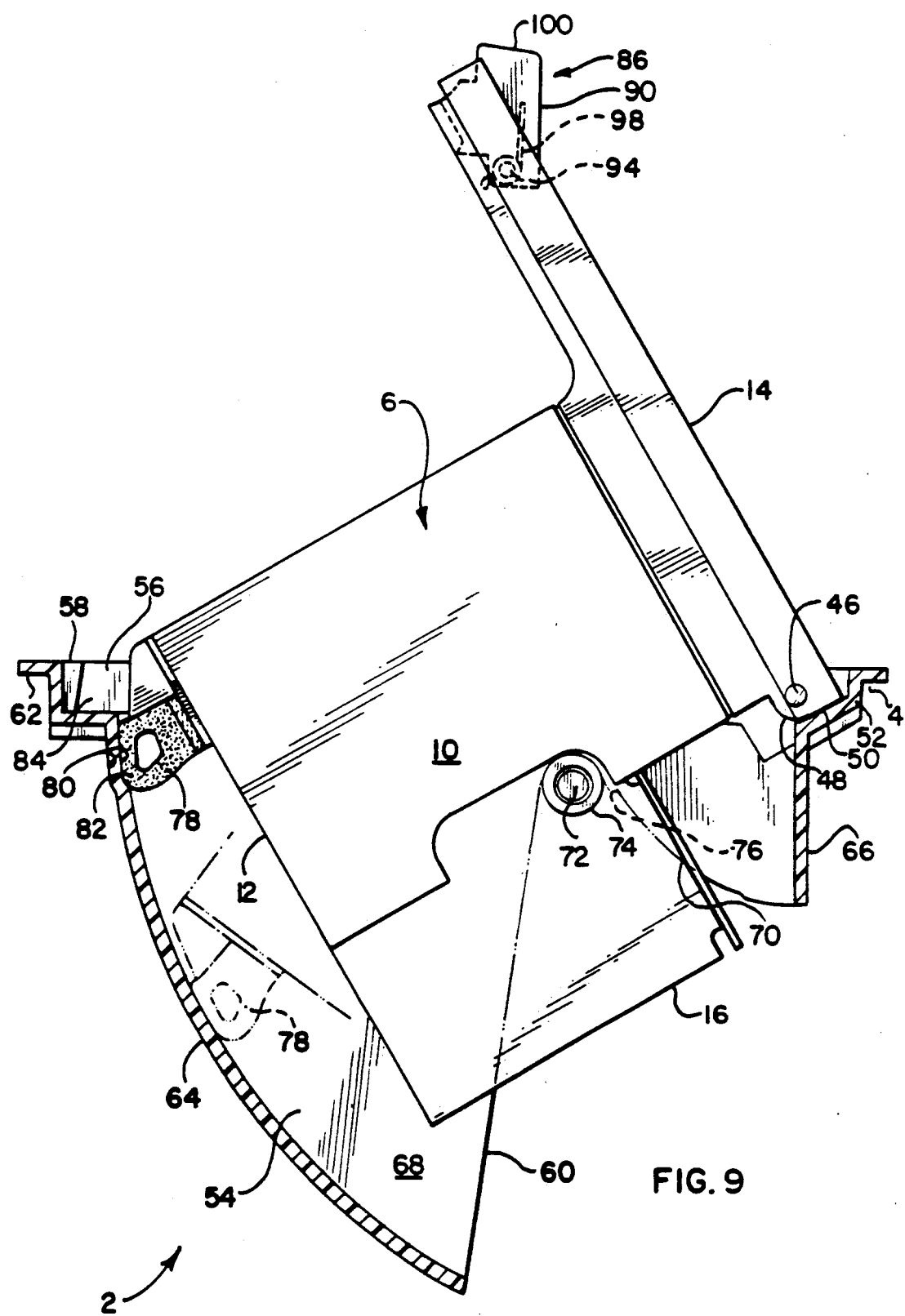
FIG. 9 is a cross-sectional view of an alternative embodiment of the invention, the module is shown in the open position, which is similar to FIG. 3.

In order to return the assembly 6 from the open position to the closed position, a force is applied to the assembly 6. The force must be sufficient to move the member 78 beyond the shoulder 82 of the recess 80. Once the member 78 has been disengaged from the shoulder 82, the force applied to the assembly 6 can be decreased. In fact, after member 78 has been forced past the shoulder 82, the weight of the assembly 6 is sufficient to return the assembly 6 toward the closed position. The arcuate configuration of the sidewall 64 approximates the path which the member 78 follows upon return to the closed position. Therefore, once the assembly 6 is placed in motion, the weight of the assembly 6 is sufficient to maintain the motion of the assembly 6. It should be noted that the operator must apply a final force to the cover plate 14 of the assembly 6 to return the assembly 6 to the fully closed position An alternate embodiment is shown in FIG. 9. For ease of understanding and explanation, the same reference numerals will be used for identical parts in each embodiment. As shown in the Figure, an arcuate surface 70 is provided on the end walls 68. The arcuate surface 70 can either replace the need for the member 78 or provide a redundant means to regulate the movement of the assembly.

Arcuate surfaces 70 are provided on end walls 68, and extend from sidewall 66 toward sidewall 64. Surfaces 70 cooperate with projections 72 which extend from end walls 10 of assembly 6. The projections 72 are rounded and have smooth outer surfaces provided thereon. The projections 72 are positioned on end walls 10 so that the outside surfaces 74 engage the arcuate surfaces 70. Consequently, as assembly 6 is pivoted between the open and the closed positions, the projections 72 are slid along arcuate surfaces 70. This cooperation of the projections 72 with the arcuate surfaces 72 provides a means to distribute the forces applied to the assembly 6 when the assembly is moved between the first and second positions. As the projections and arcuate surfaces are of significant strength, the distribution of forces to these members will not cause damage to the module 2. This prevents the forces from being distributed to the weak pivot members. Consequently, a more reliable module is effected.

As shown in phantom in FIG. 9, arcuate surfaces 70 have embossments 76 which extend therefrom. These embossments 76 are positioned proximate the ends of surfaces 70 and act as a positioning means. In other words, when the assembly 6 is pivoted, projections 72 of assembly 6 will be caused to engage with embossments 76 of arcuate surfaces 70. This provides a frictional engagement between projections 72 and embossments 76, thereby maintaining the assembly 6 in position relative to casing 54 until a sufficient force is applied to the assembly 6 in order to overcome the frictional engagement. Once the frictional engagement is overcome, the projections 72 slidingly engage the arcuate surfaces 70.

Referring back to FIG. 4, and the first embodiment, in the closed position the edges of the cover plate 14 cooperate with recess 84 of casing 54. This cooperation insures that as downward forces are applied to the cover plate 14, i.e. someone stepping on the cover plate, the forces will be transferred to the metal shoulders of the casing 54 and then to the floor of the building. If additional support is required for the cover plate 14, the cover plate can be provided with a metal plate which would be integrally molded therein The metal plate would provide the additional support required to insure that the cover plate 14 would not fail.

A latch 86 is provided on the cover plate 14 at an end thereof which is opposed to the pivot member 46. As best shown in FIG. 1, latch 86 is provided in a recess 88 which is provided in the cover plate 14. Referring to FIGS. 5 through 8, latch 86 is movable between a first position and a second position. In the first position, as shown in FIG. 5, the latch 86 is closed, and in the second position, as shown in FIG. 8, the latch 86 is open.

Latch 86 has a top surface 90 and side surfaces 92 which extend from the top surface 90 in a direction which is essentially perpendicular thereto. Extending from each side surface 92 is a pivot projection 94. The axis of the pivot projections 94 extend in a plane which is essentially parallel to the plane of the top surface 90. Also extending from the side surfaces, in the same direction as pivot projections 94, are tabs 95 (as shown in FIG. 5).

As shown in FIGS. 5 through 8, pivot projections 94 are positioned in openings 96 (shown in phantom) of the cover plate 14. The openings 96 are of an elongate configuration, such that one of the dimensions of the opening 96 is significantly larger than the corresponding dimension of the respective pivot projection 94. Springs 98 are placed in engagement with the pivot projections 94, as will be more fully discussed.

In operation, latch 86 is originally provided in the first or closed position In this position, as shown in FIG. 5, end surfaces 100 of the top surface 90 and the side surfaces 92 are placed in engagement with a holding surface 102 of the rim 52. The slight angle associated with these surfaces 100, 102 is sufficient to insure that the latch 86 can not be moved from the closed position until a force is applied thereto.

In order to move the latch 86 from the closed position, the operator must apply a force to the top surface 90 in the direction indicated by the arrow in FIG. 5. This will force the latch 86 to move away from the holding surface 102. This movement is made possible because the configuration of openings 96 allow the pivot projections 94, and the latch 86, to move relative to the cover plate 14.

When the pivot projections 94 are moved to the rear of openings 96, as shown in FIG. 6, the spring 98 causes the latch 86 to pivot about pivot projections 94. This pivoting is continued until the end surfaces 100 of the side surfaces 94 engage the holding surface 102. The cooperation of the springs 98 and the surfaces 100, 102 maintains the latch 86 in this intermediate or partially opened position until a force is applied to the latch. Tabs 95 also engage the bottom surfaces of the side surfaces to help maintain the latch 86 in the intermediate position.

With the latch 86 in a partially opened position, the operator can grasp the latch 86 and apply an upward force thereto. This force is sufficient to cause the end surfaces 100 to disengage from the holding surface 102. As tabs 95 are in engagement with the side surfaces 92, the cover plate 14 is forced to move upward as latch 86 is moved upward. As the upward motion occurs, end surfaces 100 are moved beyond holding surface 102. This allows spring 98 to force the latch 86 to the open position shown in FIG. 7. In this open position, pivot projections 94 are forced to the front of openings 96. With projections 94 in the front of openings 96, tabs 95 are moved into recesses 97 provided in the side surfaces. The recesses 97 (shown in phantom in FIGS. 5 through 8) allow the tabs 95 to be moved upward, until tabs 95 contact stop surfaces 99. With tabs 95 in engagement with the stop surfaces 99 and pivot projections 94 positioned in the front portions of openings 96, latch 86 is arranged in the open position.

With latch 86 and assembly 6 in the open position, the operator electrically connects the plugs to the electrical sockets 34, 36 located in the assembly 6. The operator then manipulates the wire of the plug into a wire receiving portion 104 of the latch 86. The cooperation of the side surfaces 92, top surface 90, holding surface 102, and wire stop surfaces 108 insure that the wire will be maintained in the wire receiving portion 104.

Once the plug has been installed, the assembly 6 is pivoted to the closed position It is important that the wires which extend from the assembly 6 be protected from damage. Therefore, as the assembly 6 is moved to the closed position, the latch 86 must remain in the open position. As shown in FIG. 8, with the assembly 6 moved to the closed position, bottom surfaces 106 of the side surfaces 96 engage the rim 52. Also, a portion of the top surface 90 engages a portion of the cover plate 14. This insures that the latch 86 will not move as a downward force is applied thereto. Consequently, the wires which extend from the assembly will be protected.

In order to remove the wires from the latch 86, the latch is lifted, causing the assembly 6 to be pivoted toward the open position The operator then returns the assembly 6 toward the closed position. In order for the assembly 6 to reach the closed position, the operator must exert a force, in the directions indicated by the arrows in FIG. 7, on the latch 86, to move the latch further into the recess 88. This allows the end surfaces 100 of the side surfaces 92 to move past holding surface 102. Once the cover plate 14 is properly seated on shoulders, the latch 86 is allowed to return to its original, first position, thereby insuring that the assembly 6 will be maintained in the closed position until required for operation, at which time the process is repeated.

The configuration of the access flooring module provides several important advantages. First, the flexibility of the module allows the module to be utilized with many different configurations of signal and power components. This reduces the cost associated with altering the module to conform to the everchanging needs of the office environment. A second advantage relates to the fact that a means is provided to insure for the smooth movement of the assembly between the open and closed positions. This controlled movement reduces the possibility of damaging the electrical components provided in the assembly. A third advantage is found in the operation of the latch. The movement of the latch is designed to allow for easy access to the module, while providing the means required to protect the wires which extend from the module. The isolation grounding feature is a fourth advantage of the invention.

Figure 10:
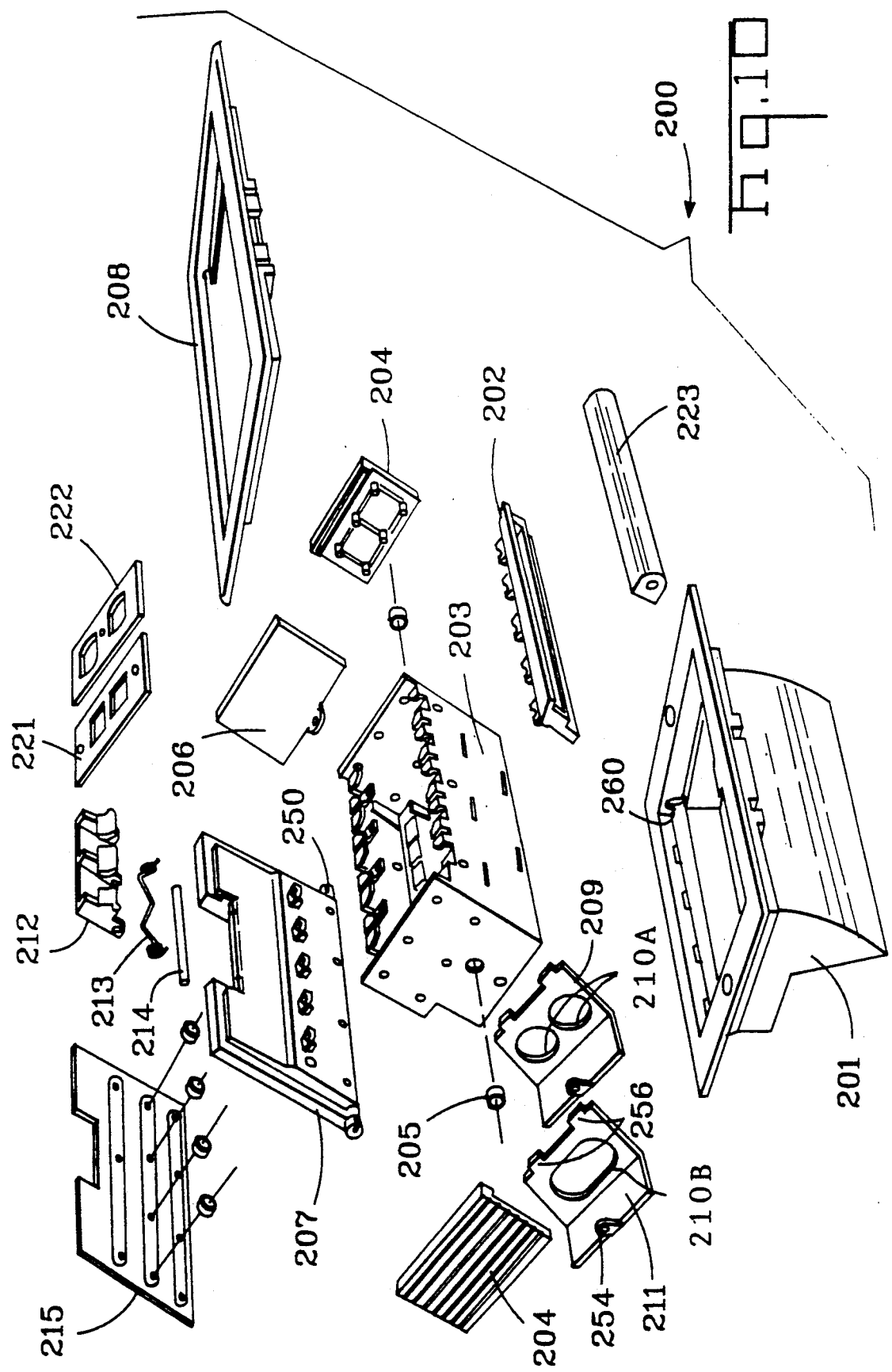
FIG. 10 is an exploded perspective view of another embodiment of the invention.

An alternate embodiment of this access floor module is depicted in FIGS. 10-13. FIG. 10 is an exploded view of the component of the alternate access floor module 200. These components comprise a shroud 201, which comprises a metallic outer housing to which a front trim member 202 is secured. A frame or box 203 fabricated from a relatively stiff metal, such as 6-90 grade steel, comprises a welded structure. Plastic side trim members 204 can be attached to the ends of the frame 203, and this frame is pivotably mounted and operable as in FIGS. 3, 4 and 9. A stop 205 is secured to the exterior of the two endwalls of frame 203 to limit the upward rotation of the frame box 203 relative to the shroud 201 in the same manner as in the embodiment of FIGS. 1-9. A plate separator 206 is dimensioned to seat within the front face of frame 203 in the same manner as the wall separator 26 of the preferred embodiment of this invention. A plastic cover member 207 can be secured to the top wall of the shroud 201. This plastic cover member 207 will be positioned on the top of the opening in the shroud 201 when the frame box 203 is rotated to the closed position. This frame assembly can be inserted through the opening in the shroud 201. A bezel 208 can be fitted around the exterior of the shroud 201 and then the module 200 can be positioned within an access floor opening.

FIG. 10 also shows a hard wire bracket 209 and a data bracket 211 which are fastened on the rear face of the frame 203 to permit attachment of cables in the access floor plenum to the rear of the frame box 203. These brackets 209 and 211 define wall sections and are fitted adjacent opposite end walls of the frame box 203 to permit insertion through cable exit apertures 210 of high tension and low tension cables into opposite ends of the frame box 203. Hard wire bracket 209 is shown to include a pair of single-cable-diameter apertures 210A, and data bracket 211 is shown to include a single large aperture 210B; brackets 209,211 comprise cable exit means including cable exit apertures appropriate for a pair of armored high tension cables and a pair of insulated low tension data cables respectively.

A wire shield 212 can be assembled to cover 207 in the same manner as depicted for the embodiments for FIGS. 1-9. This wire shield comprises a plastic member which together with a shield spring 213 and a shield axle 214 not only provide a shield for wires exiting the access floor module in a closed position, but also provides a rotatable latch configuration for securing the cover 207 of an unused access floor module 200 in a closed position. A plate 215 of a relatively rigid material is attached to the exterior of the cover 207 by a plurality of screws. This plate 215 is not only attached to the cover 207 but is also attached to the top wall of the box frame 203 by screws or Tinnerman type clips.

A plurality of face plates represented by a communication outlet faceplate 221 and a duplex faceplate 222 will be secured on the exterior of the frame box 203 once outlets are inserted into the frame box through the front of the module. A deformable member 223 is also shown, similar to member 78 of FIGS. 1 to 9.

Figure 11:
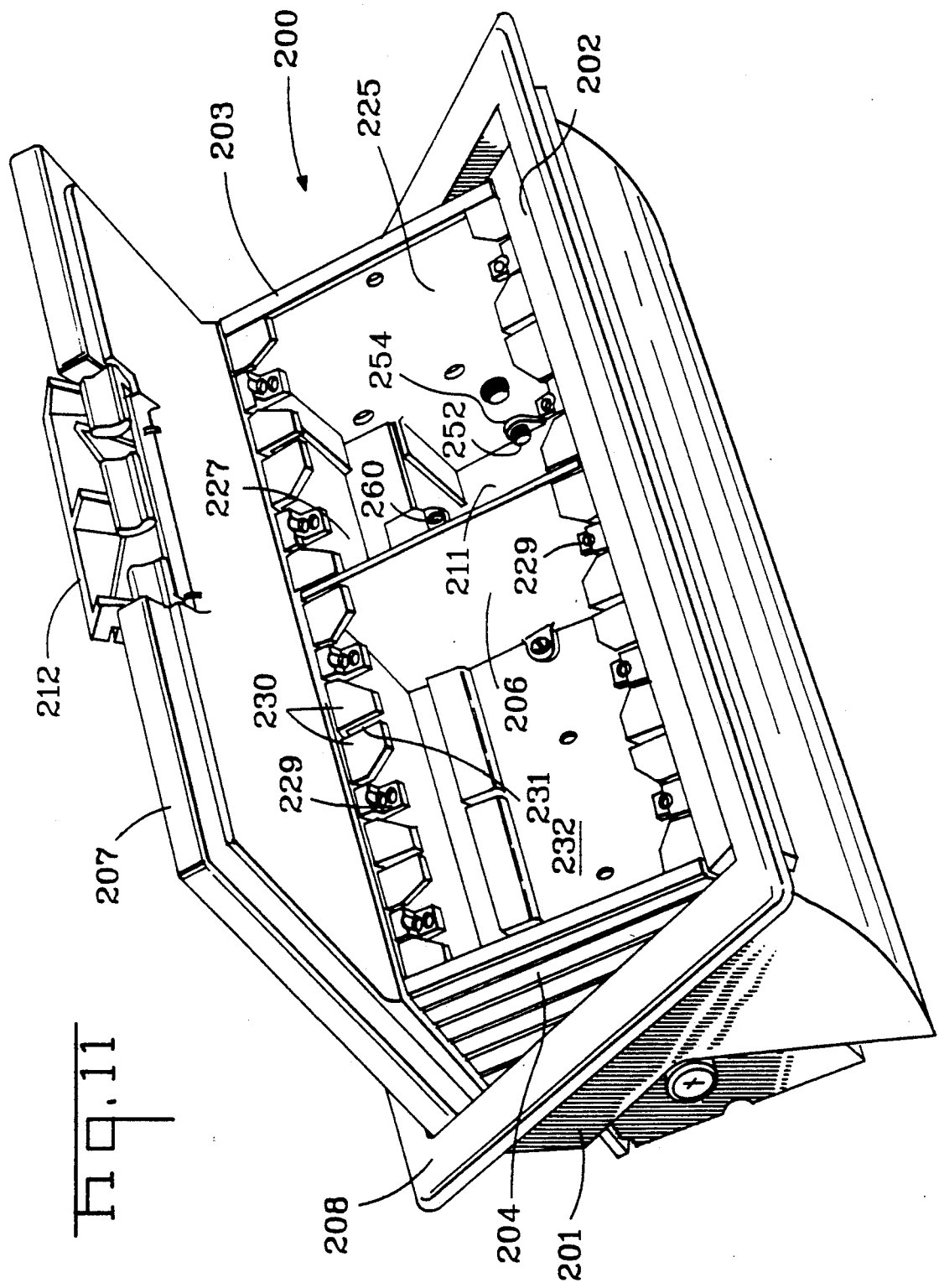
FIG. 11 is an assembled front view of the module of FIG. 10 in the open configuration.

FIG. 11 shows a front view of the module with the frame 203 positioned within the shroud 201 and with the bezel 208 secured to the shroud. Referring to FIGS. 11 and 13A-13C, the frame 203 is in the form of a four sided box having endwalls 225 and 226, and top wall 227 opposed to bottom wall 228. A plurality of internal communication outlet mounting tabs 229 extend inwardly from the top wall 227 and the bottom wall 228 at the front face of the box frame 203. These tabs 229 are slightly recessed from the front of the box frame 203. Plates having tabs 230 defining plate mounting slots 231 are located on the front face of the top and bottom walls 227 and 228. An intermediate wall 232 extends between the top wall 227 and 228 and frame 203. This wall does not extend to the endwalls 225 and 226 leaving openings 233 and 234 adjacent the endwalls. Brackets 209,211 are shown to be identical except for cable exit aperture 210A,210B and can be secured to a frame at either of openings 233,234 depending upon the particular cable arrangement desired at the particular site of the structure in which the access floor module 200 is to be mounted. Best seen in FIGS. 12 and 13A, cable exit aperture 210A,210B are disposed through portions of brackets 209,211 which are at such an angle as to permit the cables extending therethrough to assume an angle about perpendicular with the rear wall of the frame.

As depicted in FIGS. 11 and 13B, this access floor module is suitable for positioning five separate outlets in side-by-side configuration. Standard duplex outlets having upper and lower mounting ears can be attached to mounting tabs 229 in a relatively conventional manner. Other outlets, such as a communication outlet of the type disclosed in U.S. Pat. No. 4,756,695, incorporated herein by reference, can be interchangeably inserted in any one of the five positions in the module 200. As with the embodiment of FIGS. 1-9, high tension outlets, such as a duplex outlet, should be separated from low tension outlets, such as a communications outlet for safety purposes. Indeed, such separation is necessary under applicable codes. The separator plate 206 is the physical separator employed in this invention. However, the position of openings of 233 and 234 adjacent opposite endwalls in the box frame facilitate the wiring of both high tension and low tension outlets in the same module. In an access floor module containing both high tension and low tension outlets, a high tension cable can be routed through one of the openings 233 or 234 and low tension cables can be routed through the other opening, on the opposite side of the separator wall 206. Note that different populations of high tension and low tension outlets can be employed, since the position of the separator plate 206 can be altered.

FIG. 12 depicts the manner in which high tension cables 240 and low tension cables 241 can be attached to the rear of the module 200. The high tension cable is secured to the hard wire bracket 209 and the low tension cable 241 is secured to the data bracket 211. For ease of handling, cable ties 242 can be used to secure the cables 240 and 241 to the rear of the module.

The detailed structure of the frame 203 is shown in FIGS. 13A-13C. The structure is a rigid box frame formed by employing a steel plate which is formed into a box configuration. The intermediate wall 232 is welded in the box frame between the front face 244 and the rear face 245. This rigid box frame provides for both structural support of the cover of the access floor box and a simple means for assembling cables from the rear of the access floor module and outlets from the front of the access floor module As shown in FIG. 12, the cables 240, 241 can be simply assembled to the module 200 with the module 200 raised out of the floor. These cables are routed through respective openings 233 and 234 and are attached to the brackets 209 and 211 which are mounted on the rear of the frame 203 by the use of suitable screws 252 extending through apertured mounting flanges 254 (FIG. 11). Tabs 256 on the brackets 209, 211 can be inserted into slots 258 (FIG. 13B) in the intermediate wall 232 and the brackets can then be screwed to the endwalls 225 and 226. With the cables extending through openings 233 and 234 to the front of the box, outlets can then be wired to the respective cables. These outlets can then be secured to tabs 229. Note that all that is required is that the various outlets must have substantially the same overall length and width dimensions so that they can fit in any one of the five positions within this access floor module 200. Once the conductors have been attached to the respective outlets and the outlets have been assembled, appropriate face plates can then be added. The access floor box s then positioned to be mounted with the top of the box being substantially flush with the floor. In the closed position the rear face of the frame 203 will be below the floor and will open horizontally into the plenum formed below an access floor. Cables can then be fed horizontally into the opening on the rear face of frame 203. Access module 200 is opened by simply rotating the frame, to which the cover is attached, about pivots 250 at the rear of the assembly. These pivots 250 are received with appropriate grooves 260 within the shroud 201 in the same manner as with the embodiment of FIGS. 1-9. Once rotated to the open position, the various outlets are easily accessible above the floor.

Not only does this assembly provide means for installation of cables into the access floor module and installation of outlets therein, but the assembly provides a large number of easily accessible programmed outlets. Thus, a relatively large opening is required and the size of the cover 207 and cover plate 215 are also relatively large. When the access floor module is in a closed position, the cover plate engages the shroud 201 along with a periphery to provide structural support. Loads applied to the cover 207 are not transmitted to the pivots 250. Despite the relatively large size of the cover 207 the loads which must be carried pursuant to applicable codes can be carried because the cover plate 215, which is relatively rigid, is attached directly to the box frame 203 which extends below at least a portion of the cover plate 215. This composite structure relies upon not only the load bearing capability of the cover plate but adds the load bearing capability of the structural frame box to that of the upper plate. In other words, the box frame supports the plate 215 to permit even larger loads to be carried by the module 200.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. An enclosure for housing a plurality of first and second electrical sockets separately interconnectable to high tension and low tension conductors of one or more high and low tension cables, the enclosure comprising:
   a frame of opposing top and bottom walls and opposing endwalls having an open front face and extending to a rearward frame end, and including an intermediate wall extending between said top and bottom walls parallel to the front face spaced intermediate said front face and said rearward frame end with openings at opposite ends of said intermediate wall, said frame being mountable at a selected site in a structure requiring high and low tension conductors, and each opening being larger than twice a cable diameter;
   cable mounting brackets securable to the frame at respective said openings and being defined by wall sections adapted to adjoin a said endwall, said top and bottom walls and said intermediate wall and close said openings without occupying space within said frame forwardly of said intermediate wall and in a manner permitting said high and low tension cables to extend through respective ones of said brackets, a high tension one of said cable mounting brackets having at least a pair of cable receiving apertures therethrough each being a single cable diameter in dimension for a respective one of said high tension cables to just fit therein and whereby said high tension cable mounting bracket is adapted for use with armored cable containing high tension conductors and being locatable adjacent one opening of the wall selected to correspond with particular site cable arrangement requirements, and a low tension one of said cable mounting brackets having an aperture therethrough large enough to be adapted to receipt of at least a pair of said low tension cables therethrough and being locatable adjacent the other opening of the wall; and outlet mounting bracket means, at the front face of the frame, spaced from said intermediate wall by a distance sufficient to allow either a high tension conductor or a low tension conductor to pass between the wall and an outlet attached to said outlet mounting bracket means;

whereby one or more high tension conductor cables can be brought into one end of the frame selected on site and one or more low tension conductor cables into the other end of the frame as desired, and high tension electrical outlets can be attached to the outlet mounting bracket means adjacent the one end of the frame and low tension electrical outlets can be attached to outlet mounting bracket means adjacent the other end of the frame as desired and enabling the enclosure to be completed and programmed on site, for high and low tension conductors of the high and low tension cables to be routed to respective appropriate outlets along and forwardly of the intermediate wall from the one and other frame ends respectively.

2. The enclosure of claim 1 wherein the outlet mounting bracket means define a plurality of positions between opposite ends of the frame, each of the positions being suitable for attachment of either a high tension or a low tension outlet.

3. The enclosure of claim 1 wherein the outlet mounting bracket means comprise tabs located at the top and bottom of the front face, the tabs being positioned so that an outlet having upper and lower flanges can be secured to the tabs.

4. The enclosure of claim 1 including separator means, the outlet mounting bracket means being configured for receipt of separator means between any two adjacent outlets.

5. The enclosure of claim 1 wherein the frame is adapted to be mountable to a floor at an opening therethrough and further adapted to be rotatable between an open and a closed position with respect to the floor opening, and the outlets and the conductors are attached to the frame and thereby rotate with the frame.

6. An access floor module for use with wiring extending beneath the floor of a structure, the module comprising:
a box frame at least partially open on front and rear faces of the box frame and pivoted about opposite ends of the box frame;
cable exit means adjacent the rear of the box frame and near the pivot; and
outlet mounting means on the front of the box frame whereby rotation of the box frame exposes the outlets mounted on the front of the box frame, the cable exit means and the outlet mounting means being fixed to the box frame and rotatable therewith,
the cable exit means being disposed near each of opposed ends of the rear face and including sections having cable exit apertures extending therethrough, said sections being oriented near 90° with respect to the rear face and generally facing the other of the opposed ends at least near the pivot,
whereby the cable ends exiting through said cable exit apertures and outwardly of the box frame are at least initially directed along the rear face of the box frame remaining generally horizontal with respect to the floor upon pivoting of the box frame.

7. The access floor module of claim 6 wherein the box is fabricated of stiff members so that the box frame provides structural support for loads applied to the top of the access floor module.

8. The access floor module of claim 7 wherein the box frame comprises a top wall, a bottom wall and end walls, the top wall being parallel to the floor with the end walls extending perpendicular to the floor when the module is in the closed position;

9. The access floor module of claim 8 including a cover attached to the top wall of the box frame.

10. The access floor wiring assembly of claim 8 wherein the bottom wall is partially defined by an intermediate wall having openings adjacent opposite endwalls thereof for providing communication means for passage of cables between the front and rear faces.

11. The access floor wiring assembly of claim 10 wherein the cable exit means includes brackets attachable to the intermediate wall and extending over the rear of the openings, each bracket including at least one aperture for receiving a cable therethrough.

12. The access floor module of claim 6 including means for supporting a cover when the module is closed, the box frame supporting peripheral edges of the cover between peripheral edges of the supporting means.

13. The access floor module of claim 12 wherein the means for supporting the cover comprises a shroud in which the box frame is positioned, the shroud including means for mounting the module in an opening in the floor.

14. An access floor wiring assembly received within a plenum beneath an access floor including an access floor module communicating with the plenum, the module comprising:
a box frame at least partially open on front and rear faces of the box frame and pivoted about opposite ends of the box frame;
means for mounting the box frame in the opening in the floor so that the box frame is positioned beneath the floor in the plenum extending horizontally with respect to the floor can extend into the rear of the box frame;
cable exit means adjacent the rear of the box frame and near the pivot; and
outlet mounting means on the front of the box frame whereby rotation of the box frame exposes the outlets mounted on the front of the box frame, the cable exit means and the outlet mounting means being fixed to the box frame and rotatable therewith,
the cable exit means being disposed near each of opposed ends of the rear face and including sections having cable exit apertures extending therethrough, said sections being oriented near 90° with respect to the rear face and generally facing the other of the opposed ends at least near the pivot,
whereby the cable ends exiting through said cable exit apertures and outwardly of the box frame are at least initially directed along the rear face of the box frame remaining generally horizontal with respect to the floor upon pivoting of the box frame.

15. The access floor wiring assembly of claim 14 wherein the means for mounting the box frame in the opening in the floor comprises a shroud in which the box frame is mounted, the box frame being rotatable relative to the shroud.

16. The access floor wiring assembly of claim 14 wherein the box frame has an intermediate wall having openings on opposite ends thereof for providing communication between the front and rear faces.

17. The access floor wiring assembly of claim 11 wherein the cable exit means includes brackets attachable to the intermediate wall and extending over the rear of the openings, each bracket including at least one aperture for receiving a cable therethrough.

18. The access floor wiring assembly of claim 14 wherein the outlet mounting means comprises means for mounting a plurality of outlets side by side.

19. The access floor wiring assembly of claim 14 wherein the box frame includes cable securing means along the rear face at ends opposed from the ends from which the respective cables exit the box frame.

* * * * *